Feb. 10, 1942.　　　　M. MALLORY　　　　2,272,271
METHOD AND APPARATUS FOR MACHINING MATERIALS
Filed April 10, 1939
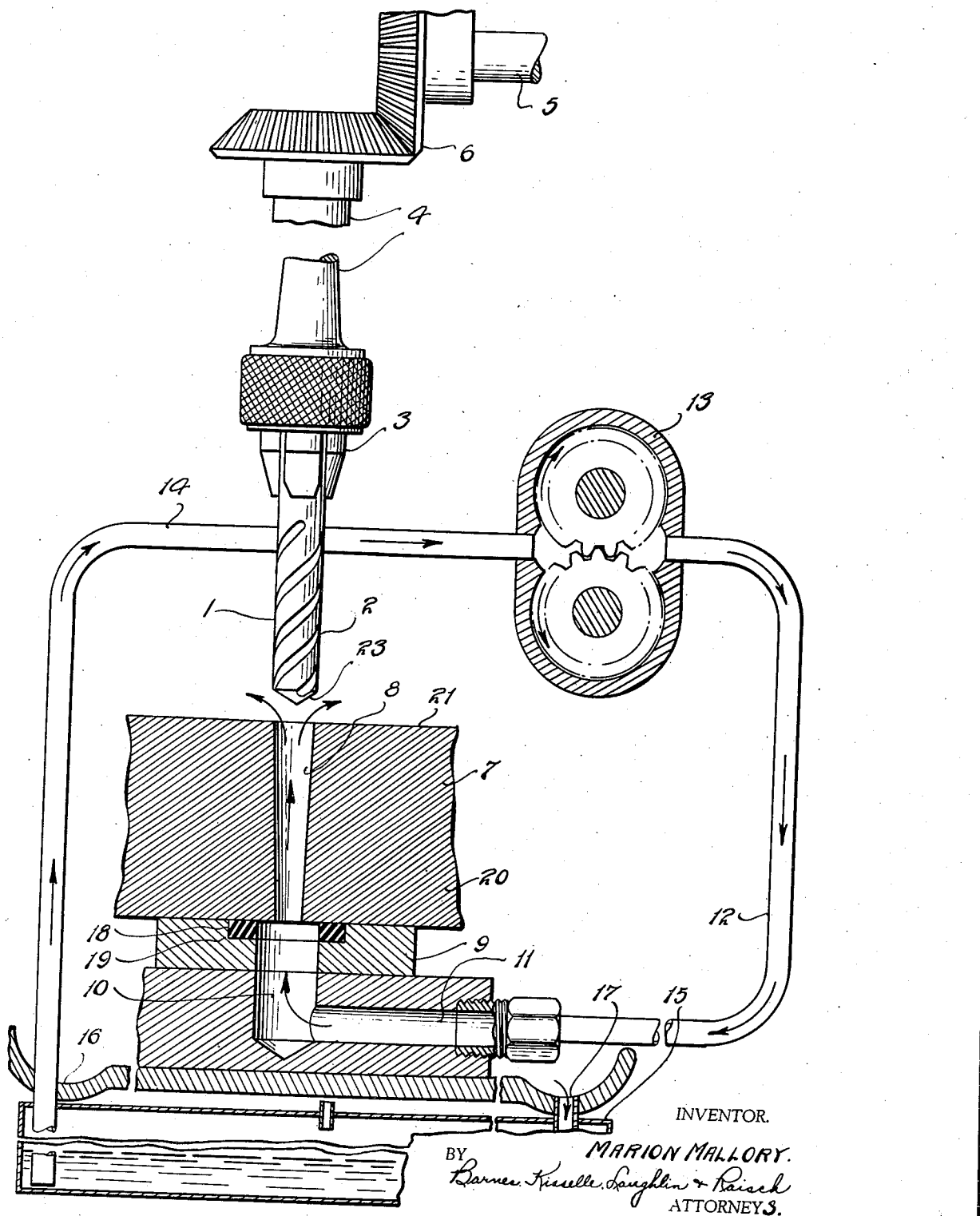
INVENTOR.
MARION MALLORY.
BY
ATTORNEYS.

Patented Feb. 10, 1942

2,272,271

UNITED STATES PATENT OFFICE 2,272,271

METHOD AND APPARATUS FOR MACHINING MATERIALS

Marion Mallory, Detroit, Mich., assignor to The Mallory Research Company, Detroit, Mich., a corporation of Michigan Application April 10, 1939, Serial No. 267,013

14 Claims. (Cl. 77—68)

This invention relates to a method and apparatus for machining materials. More particularly the invention is concerned with machining a preformed hole in a solid material, such, for example, as metal and metal alloys.

The term "machining" is used herein to denote any operation on metal or solid material by means of a cutting tool such, for example, as drills, threading tools, reamers, hones and grinders.

A better understanding of the invention herein disclosed will be obtained from a brief reference to the prior or present practice. In machining a cored or preformed hole, whether using drills, reamers or end mills, the cuttings or chips naturally fall downwardly and collect around the cutting edges of the tool. In fact, they collect and build up on the cutting edges, and prevent the tool from cutting, resulting in the scoring of the metal, and burning and annealing of the tool. For this reason, it is practically impossible to machine smooth holes of considerable depth.

Many attempts have been made to overcome this difficult problem, for example, by means for removing the tool many times during the machining operation to pull out the cuttings, by the use of special tools having special flutes or spirals to throw these chips out, and by running the tools at tremendous speeds to throw out the chips and cuttings. None of these methods have proven satisfactory, regardless of the material used in the tools. Special cutting liquids introduced at the top are used, but, when the tool is designed to throw out the chips at the top, it plays the role of a pump and throws the liquid back out of the hole and prevents it from reaching the bottom of the hole and the cutting edges of the tool. Naturally, these cuttings build up on the tool and cause gouging and scoring of the hole, as well as destruction of the tool, itself. Because of this, it has been practically impossible to machine a cored hole so that it would have a uniform given diameter and a smooth wall.

Due to the fact that it is practically impossible to obtain a smooth hole by machining where the depth of the hole is great, many manufacturers semi-finish the hole by drill, reamer or another cutting tool, which leaves a rough hole. They then finish the hole by broaching and burnishing, but even this method is not entirely satisfactory because the collection of the chips and cuttings on the tools leaves gouges and pits in the hole. Consequently, considerable stock must be left for the broach to remove so as to clean up the entire surface, and, in attempting to remove so much stock with the broach, the metal will build up on the blades of the broach and cause more trouble, such as breaking of the broaches, variation of the holes, especially when the walls are thin, due to the broach crowding the metal away from it and the metal closing back in when the broach is removed.

The object of my invention is to remove the chips or cuttings from the preformed or cored hole as quickly as the tool cuts them from the hole, which eliminates the trouble heretofore outlined.

The object of my invention is obtained by means of an apparatus for flowing the lubricating liquid under pressure through the preformed hole at a direction opposite that to which the machining tool is cutting and to force the lubricating liquid through in harmony with the centrifugal pumping action of the tool, so that both the pressure and centrifugal action speed up the lubricating liquid and remove the chips from the cutter blades of the tool as rapidly as the tool removes them from the walls of the hole which it is cutting.

By the use of my method, long smooth holes can be drilled without pits or gouges. If it is necessary to have a bright, mirror-like uniform finish, a reamer can be used after the drill, using the same method as used when the hole was drilled. Then, if desired, in certain instances a burnishing tool may be forced through the hole, which produces a uniform hole with a mirror-like finish. However, in most cases the use of a burnishing tool is unnecessary to obtain a mirror finish.

Referring more particularly to the drawing, there is shown a drill 1 having helical flutes 2. The drill is supported in a drill holder 3 carried by the rotatable shaft 4. The drill shaft 4 is driven from a power or driving shaft 5 through the beveled gears 6. The work 7 has a cast hole 8. The work 7 may be made from metal, metal alloy, or any other solid material. The hole 8, which is to be machined to size or otherwise finished, may be cast or otherwise formed in the work 7. The work is supported upon a support 9 which is provided with a vertical passageway 10 communicating with a horizontal passageway 11. The passageway 11 is connected by a pipe line 12 with the outlet port of the pump generally designated 13. A pipe 14 connects the inlet port of the pump 13 with a reservoir 15. The reservoir 15 contains a lubricating liquid such as oil or a water-oil emulsion. If preferred, the water-oil emulsion can also contain a cutting compound in suspension. The work support is provided with a tray 16 having a down spout 17 leading back to the reservoir 15.

The work support 9 is provided with a rubber gasket 18 which is seated in the counterbore portion 19 of the support. This gasket surrounds the upper end of the passageway 10. In drilling the precast hole 8 to size, the work 7 is placed upon the work support 9 with the hole 8 preferably aligned with the vertical passageway 10. The gasket 18, when the work support 9 is not loaded, preferably projects above the upper surface 20 of the work support 9. Thus, when the work 7 is placed upon the gasket and the drill 9 brought down in the conventional manner to drill the hole 8, the pressure of the drill and the weight of the work 7 places the gasket 18 under load and seals the joint between the support 9 and the bottom face of the work 7 around the junction of the passageway 10 and the hole 8.

The pump 13 is driven so that the lubricating liquid flows in the direction indicated by the arrows, that is, upwardly through passageway 10 and opening 8 where it overflows the work, runs down into tray 16 and thence through down spout 17 into the reservoir 15. The pump draws the lubricating liquid from reservoir 15 through pipe line 14 back to the intake port side of the pump.

The drill 1, while being rotated from the drive shaft 5, is brought down and drills the hole 8 to the size desired in a single operation, that is, without withdrawing the drill 1 until it has passed completely through hole 8 and drilled it to the diameter desired. The size of the drill 1, of course, will depend upon the desired finished size of the hole 8. As the rotating drill 1 cuts down through the work 7, the lubricating liquid flows through the flutes 2 and carries the cuttings with it where they are deposited upon the upper face 21 of the work. The cuttings are removed immediately from the leading or working end 23 of the drill and thus have no opportunity to cut or dig into the face of the opening 8. Because of this action the surface of the hole 8 after it has been drilled to size is smooth. After the drill 1 has passed completely through the opening 8, which is now machined to size, the drill is withdrawn and the work removed from the support 9.

The pressure of the lubricating liquid which is forced through pipe line 12 and upwardly through the opening 8 will vary somewhat with the type of machining operation. In all cases, of course, the force of the lubricating liquid must be sufficient to remove the cuttings from the working end 23 of the drill and force them upwardly through the flutes and out of the hole 8.

The machining of the hole 8 by a drill is illustrative only. The same method and apparatus can be used in other cutting or machining operations on preformed holes.

I claim:

1. A method for machining a piece of work having a hole through the same, comprising the step of progressively machining the hole in one direction and forcing a liquid through the hole unidirectionally in the opposite direction and discharging the liquid freely from the hole in the work directly to atmosphere to thereby remove the cuttings from the hole as soon as cut.

2. A method for machining a piece of work having a hole therethrough, comprising the step of advancing a machining tool through the hole in one direction and simultaneously forcing a liquid through the hole outside the tool unidirectionally in the opposite direction and discharging the liquid to atmosphere on to the surface of the work from the end of the hole which the tool enters to thereby remove the cuttings from the leading end of the tool as soon as cut and remove them from the hole and separate the cuttings from the liquid.

3. A method for machining a piece of work having a hole therethrough with one end of the hole communicating directly with atmosphere, comprising the step of advancing a machining tool through the hole in one direction without withdrawing the machining tool and forcing a lubricating fluid through the hole unidirectionally in the opposite direction and outside the tool and discharging the liquid freely from the said end of the hole directly to atmosphere to thereby remove the cuttings from the leading end of the tool as soon as cut and force them upward toward the trailing end of the tool and out of the hole.

4. A method for machining a piece of work having a hole therein open at both ends comprising the step of inserting a machining tool in one end of the hole and advancing the same through the hole toward the opposite end and forcing a lubricating liquid into the hole through the second mentioned end and causing the lubricating liquid to flow toward and out of the end of the hole through which the machining tool entered to discharge the liquid freely on top of the work and thereby remove the cuttings from the hole.

5. A method for machining a piece of work having a preformed hole therein, comprising the step of advancing a rotating fluted machining tool through the hole in one direction and forcing a liquid through the hole outside of the tool unidirectionally in the opposite direction and discharging the liquid freely from the hole in the work to atmosphere to thereby remove the cuttings from the cutting end of the tool as soon as cut and thence out of the hole whereby the rotation of the tool assists in forcing the liquid through the hole.

6. A method for machining a piece of work having a preformed hole therein with one end of the hole opening directly to atmosphere comprising the step of advancing a rotating machining tool through the hole in one direction only until the machining operation on the hole is completed, simultaneously forcing a lubricating fluid through the hole unidirectionally in the opposite direction and discharging the fluid from the said end of the hole to atmosphere to remove the cuttings from the hole as cut whereby the rotation of the tool assists in forcing the fluid through the hole, and thereafter withdrawing the tool from the machined hole.

7. An apparatus for machining a piece of work having a hole formed therein with one end of the hole opening directly to atmosphere comprising a support adapted to support the work at the opposite end of the hole during the machining operation, a rotary machining tool adapted to be advanced through the hole toward the support, and means including a conduit connected to the opposite end of the hole for forcing a liquid into one end of the opening in the work, through the opening in the work and out the other end of the opening while the machining tool is advancing through the work, the said liquid flowing unidirectionally in a direction opposite to the advancing tool and discharging through the first mentioned end of the hole on to the surface of the work whereby the liquid removes the cuttings from the leading end of the tool and carries them out of the opening and separates the cuttings from the liquid.

8. An apparatus for machining a piece of work having a hole formed therethrough comprising a support having a passageway therein adapted to support the work with the passageway in the support communicating with the opening in the work, a distortable gasket in said support adapted to be placed under load by the said work for sealing the joint between the work and the support about said opening, a fluted rotary machining tool adapted to be advanced through the hole toward said support, and means for forcing a liquid through the passageway in the support and the opening in the work while the machining tool is advancing through the work, the said fluid flowing at all times through the hole in opposition to the advancing tool whereby the cuttings are removed from the leading end of the tool and ejected from the opening.

9. In an apparatus having a solid machining tool advanceable downwardly through a hole in a piece of work to machine the said hole, means for forcing a lubricating liquid into the lower end and upwardly through and out the upper end of said hole in a direction always opposed to that of the advancing tool whereby the cuttings of said tool are removed from the cutting end of the tool and hole as soon as formed and deposited upon the top of said work where the cuttings separate from the lubricating liquid.

10. In an apparatus having a solid machining tool advanceable through a preformed hole in a piece of work to machine said hole, a line containing fluid under pressure, sealing means for connecting the line to the end of the hole remote from the end of the hole through which the tool enters the hole, the fluid under pressure flowing through the hole in a direction opposite to the direction that the tool advances whereby the fluid under pressure flows out of the end of the hole through which the tool enters and is released to the atmosphere.

11. In an apparatus having a machining tool advanceable in one direction through a hole in a piece of work to machine the said hole, a support for holding the work so that the end of the hole remote from the support is unconfined and adapted to receive the tool as it enters the hole, a source of lubricating liquid under pressure, and conduit means for connecting the source of liquid under pressure with the end of the hole adjacent said support whereby the lubricating liquid is forced through the hole in a direction always opposed to that of the advancing tool and out of the unconfined end of the opening whereby the cuttings of said tool are removed from the cutting end of the tool and hole as soon as formed and discharged from the end of the hole remote from the support.

12. In an apparatus having a machining tool advanceable through a preformed hole in a piece of work to machine the said hole, a support for holding the work so that the end of the hole through which the tool enters the hole is unconfined, a source of lubricating liquid, pumping mechanism connected with said source of liquid, and a conduit containing liquid under pressure connected to the end of the hole opposite the end at which the tool enters the hole whereby the lubricating liquid under positive pressure is forced through the hole in a direction always opposed to that of the advancing tool and is discharged directly to atmosphere from the end of the hole at which the tool enters the hole whereby the cuttings of said tool as soon as formed are removed from the cutting end of the tool and the hole.

13. In an apparatus having a machining tool advanceable through a preformed hole in a piece of work to machine the said hole, a support for holding the work so that the end of the hole through which the tool enters the hole is unconfined, a source of lubricating liquid, pumping mechanism connected with said source of liquid, a conduit for connecting the pump with the end of the hole opposite the end at which the tool enters the hole whereby the lubricating liquid under positive pressure is forced through the hole in a direction always opposed to that of the advancing tool and is discharged directly to atmosphere from the end of the hole at which the tool enters the hole whereby the cuttings of said tool as soon as formed are removed from the cutting end of the tool and the hole, and means for catching the lubricating liquid as it flows by gravity off the top of the work where the cuttings separate from the lubricating liquid and for returning the lubricating liquid to its source.

14. In an apparatus having a solid machining tool advanceable through a hole in a piece of work to machine the said hole having one end opening directly to atmosphere, positive pressure means connected to the other end of the hole for forcing a lubricating liquid into said end through said hole, and out said one end thereof, in a direction always opposed to that of the advancing tool whereby the liquid is discharged from the first mentioned end of the hole directly to atmosphere and the cuttings of said tool are removed from the cutting end of the tool and hole as soon as formed.

MARION MALLORY.